United States Patent [19]

Watkins

[11] Patent Number: 4,755,050
[45] Date of Patent: Jul. 5, 1988

[54] STANDARD FOR MONITORING THE CALIBRATION OF AN OPTICAL LINE WIDTH MEASURING MACHINE

[75] Inventor: David C. Watkins, Sugar Land, Tex.

[73] Assignee: Texas Instruments Incorporated, Dallas, Tex.

[21] Appl. No.: 886,991

[22] Filed: Jul. 18, 1986

[51] Int. Cl.[4] .............................................. G01J 1/02
[52] U.S. Cl. .................................................... 356/243
[58] Field of Search ................................ 356/243, 384

[56] References Cited

U.S. PATENT DOCUMENTS 4,055,376 10/1977 Daberko ............................. 350/507

OTHER PUBLICATIONS

Swyt, *Solid State Technology*, vol. 21, No. 1, Jan. 1978, pp. 34–42.

*Primary Examiner*—F. L. Evans
*Attorney, Agent, or Firm*—Thomas R. FitzGerald; Leo N. Heiting; Melvin Sharp

[57] ABSTRACT

According to the invention there is provided a standard for monitoring the calibration of optical line width measuring machines which includes an opaque sheet having two spaced apart slots. Preferably, the sheet material is a metal such as chromium deposited on a transparent substrate.

7 Claims, 1 Drawing Sheet

STANDARD FOR MONITORING THE CALIBRATION OF AN OPTICAL LINE WIDTH MEASURING MACHINE

BACKGROUND OF THE INVENTION

The present invention relates to a standard for use in an optical line width measuring machine to monitor its calibration.

In VLSI and related technology it is becoming increasingly important to be able to measure line widths to an accuracy down to a micron as device geometries shrink. The present method of making such measurements is to use an optical line width measuring machine supplied by one of several manufacturers. Such machines are capable of measurements to the nearest micron or less but must be periodically monitored to detect drift. It is common practice to establish a standard for checking calibration which consists of a layer of photoresist deposited over a slice of silicon substrate with the photoresist patterned to have a slot. With light shining down onto the photoresist a phototube measuring reflected light indicates two spaced apart dips in intensity corresponding to the rounded edges of the photoresist slot. By curve fitting the obsrved intensity spectrum using software normally supplied by the manufacturere of the machine it is possible to extract a width measurement for selected points on each intensity trough. The latter value should remain unchanged over a period of time.

Thus, it is extremely important that the photoresist standard not change over a period of time. However, standard photoresist is subject to shrinkage or aging and is unreliable as a standard.

Accordingly, it is an object of the invention to provide an improved standard for use in checking the calibration of optical line width measuring machines.

SUMMARY OF THE INVENTION

According to the invention there is provided a standard for monitoring the calibration of optical line width measuring machines which includes an opaque sheet having two spaced apart slots. Preferably, the sheet material is a metal such as chromium deposited on a transparent substrate.

BRIEF DESCRIPTION OF THE DRAWINGS

The novel features believed characteristic of the invention are set forth in the appended claims. The invention itself, however, will be best understood by reference to the detailed description which follows, read in conjunction with the accompanying drawings, wherein:

DETAILED DESCRIPTION WITH REFERENCE TO THE DRAWINGS

Figure 1:
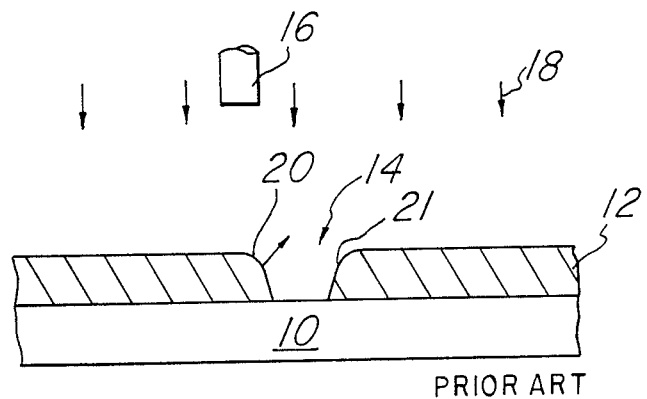
FIG. 1 is a sectional elevational view of a standard for an optical line width measuring machine being a semiconductor slice with a layer of photoresist on top patterned to have a slot.

Referring to FIG. 1, there is shown a semiconductor slice 10 onto which is deposited a photoresist layer 12. The photoresist 12 is patterned to have slot 14 whose width is of the order of 1 micron and whose edges 20 are rounded. Such a structure is in common use in monitoring the calibration of an optical line width measuring machine. Light 18 is directed onto the photoresist surface and the reflected light intensity is detected by a phototube 16.

Figure 2:
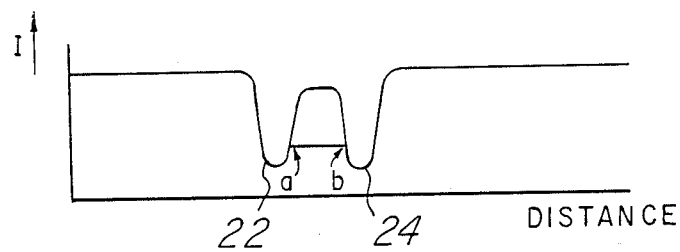
FIG. 2 is a plot of light intensity versus position across the slot of the photoresist standard of FIG. 1.

As seen in FIG. 2 the reflected light intensity I detected by the phototube 16 is constant over the flat surface of the photoresist 12 and dips down in the sloped region 20 as light is reflected off at an angle away from the phototube 16. As a result the pattern of reflected intensity has two troughs 22 and 24 corresponding to the two rounded edges 20 and 21, respectively. Normally the intensity pattern can be viewed on a video display. One can fit the waveform using vendor supplied software and extract the distance between any two points on the two troughs such as "a" and "b" and use this distance as the standard length for comparing one measurement of the standard with another. If the standard changes over a period of time then the machine accuracy will be reduced correspondingly.

Unfortunately, photoresist shrinks upon aging so that the commonly used standard is unreliable particularly for measurements to the nearest 0.1 micron or for widths of the order of a micron. In order to be able to use existing software any replacement standard must have an intensity pattern similar to that of FIG. 2.

Figure 3:
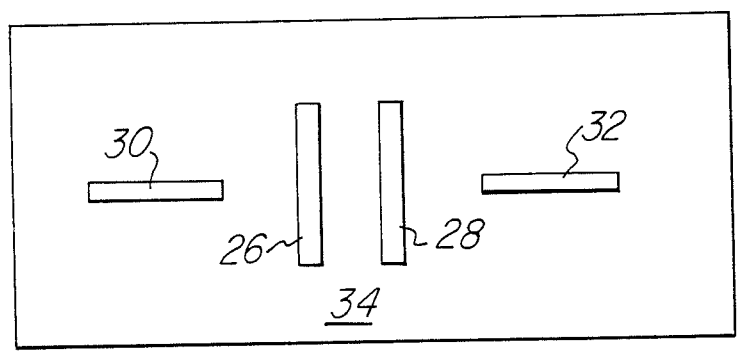
FIG. 3 is a top view of chromium plate having two spaced apart slots according to the present invention.

According to a preferred embodiment of the invention as shown in FIG. 3, a thin chromium metal sheet deposited on a glass substrate 34 is formed with two spaced apart parallel slots 26 and 28 therein. The width and separation of the slots are each approximately 1 micron. Alignment markers 30 and 32 are provided to align the sheet 34 to the machine (not shown).

The intensity pattern of reflected light due to diffraction effects around the edges of the slots is substantially the same as that of FIG. 2. In the present embodiment, however, no change of dimensions can occur over time due to the entire standard being made of chromium metal on glass nor can the standard be easily damaged by casual handling.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A calibration standard for generating a light intensity pattern similar to a light intensity pattern of a line of photoresist disposed on top of a substrate, said standard comprising:
   an opaque sheet,
   two spaced apart light transmissive slots in said sheet,
   both slots having a width sufficient to generate a light intensity pattern component equivalent to a light intensity pattern component generated by an edge of a photoresist line,
   said two slots being separated from each other by a distance generally corresponding to the width selected as a standard, so that a light intensity pattern derived from the standard will have two components spaced from each other a distance generally corresponding the the line width selected for calibration.

2. A standard according to claim 1, wherein said sheet is rigid.

3. A standard according to claim 2, wherein said sheet includes a rigid transparent substrate and an opaque film deposited on said substrate.

4. A standard according to claim 1, wherein said slots are substantially parallel.

5. A standard according to claim 4, wherein the separation of said slots is of the order of 1 micron.

6. A calibration standard for generating a light intensity pattern similar to a light intensity pattern of a line in photoresist disposed on a substrate, said standard comprising a metal film having two spaced part parallel slots, each slot adapted to generate a light intensity pattern component similar to a light intensity pattern component generated by an edge of a photoresist line.

7. A standard according to claim 6, wherein the separation of said slots is about 1 micron and the width of said slots is about 1 micron.

* * * * *